Sept. 25, 1962 G. B. REMMEY ET AL 3,055,652
BURNER ASSEMBLY
Filed May 12, 1960 2 Sheets-Sheet 1

INVENTORS
GEORGE BICKLEY REMMEY
CHARLES A. McFADDEN
BY
Busser, Smith & Harding
ATTORNEYS Sept. 25, 1962  G. B. REMMEY ET AL  3,055,652
BURNER ASSEMBLY
Filed May 12, 1960  2 Sheets-Sheet 2

*INVENTORS*
GEORGE BICKLEY REMMEY
CHARLES A. McFADDEN
BY

ATTORNEYS

U̇nited States Patent Office 3,055,652
Patented Sept. 25, 1962

3,055,652
BURNER ASSEMBLY
George Bickley Remmey, Jenkintown, and Charles A. McFadden, Lafayette Hill, Pa., assignors to Bickley Furnaces, Incorporated, Philadelphia, Pa., a corporation of Pennsylvania
Filed May 12, 1960, Ser. No. 28,650
11 Claims. (Cl. 263—40)

This invention relates to burner apparatus and, more particularly, to burner apparatus for low thermal gradient heat processing as in ceramic furnaces or kilns.

In kilns it is essential that the heating be controlled so that the work or ware may be heated from room temperature to red heat at a rate that will not destroy the ware. If the temperature at the surface of the ware is raised too rapidly, a high temperature gradient within the ware may cause damage, as by cracking. In the heat treating of ceramic material, it is desirable that the temperature gradient within the ware be maintained as low as possible as the ware is heated. Also, it is desirable that the ware be heated uniformly throughout its surface area and that spot heating be avoided.

The two heat transfer methods generally used in kilns are convection and radiation. Convection heat transfer is directly proportional to the mass velocity of the fluid or gas stream and the temperature differential between the fluid and the receiver. Radiation heat transfer is directly proportional to the temperature differential between the radiator and the receiver raised to the fourth power.

Radiation heat transfer is undesirable in kilns because of the high rate of heat transfer with a temperature differential and the high rate of increase in the heat transfer with a temperature differential increase. Also, if the ware were exposed to a high temperature radiation source, the portions of the ware in direct radiating relationship with the source would experience a rapid increase in temperature whereas the portions of the ware shielded from the radiation source would not experience any substantial rise in temperature. Thus, the ware is heated non-uniformly throughout its surface. For these reasons radiation heat transfer is to be avoided in all stages in the firing of kilns and especially in the early stages when the temperature differential between the ware and the heat source is the greatest.

When convection heat transfer is employed in kilns, it is noted that the rate of heat transfer may be increased by increasing the mass velocity of the gas stream or by increasing the temperature differential. Increasing the temperature differential has the disadvantage that it may result in a high temperature gradient in the ware. However, by increasing the mass velocity of the gas stream, a greater weight of fluid is moved past the ware at higher velocities which produces more uniform heating throughout the kiln without providing a damaging temperature differential. Convection heat transfer is desirable in kilns since it can be readily controlled and is employed in the kiln in accordance with this invention.

In the operation of the burner assemblies heretofore used in kilns, the initial portion of the heating cycle is controlled by throttling the burner to the minimum safe burning rate. While this mode of operation liberates a relatively small amount of heat, the heat is liberated at the temperature of the flame which is, for natural gas and air, approximately 3200° F. Hence, the portions of the ware in the proximity of each burner used in the kiln are contacted by a low velocity stream of hot gases. This high temperature gas stream rapidly gives up its heat to the ware in the proximity of the burner and to the furnace wall whereby the ware is non-uniformly heated. Also, since the gas stream is buoyant by reason of its low density and high temperature, it will rise to the top of the furnace chamber before passing completely across the furnace chamber. Hence, the ware at the lower end of the furnace chamber and spaced from the burner a distance beyond the point at which the gas stream begins to rise will have little or no contact with the gas stream whereas the ware close to the gas stream has contact with an excessively hot gas stream. This results in spot heating of the ware.

It is the general object of this invention to overcome the aforementioned problems in firing a kiln. Briefly stated, the burner assembly in accordance with this invention accomplishes this object by admixing room temperature air with the fully burned products of combustion of the burners to thereby lower the temperature of the gas stream and increase its mass velocity. Hence, the harmful effect of excessive gas stream temperatures is minimized and, at the same time, the ware is uniformly heated because the gas stream has added velocity to carry it all the way across the furnace chamber before it begins to rise. Localized spot heating is avoided by removing and shielding the burner combustion chamber from the heating chamber of the kiln.

The above and other objects and features of the invention will appear more fully from a consideration of the following detailed description in conjunction with the accompanying drawings wherein.

Figure 1:
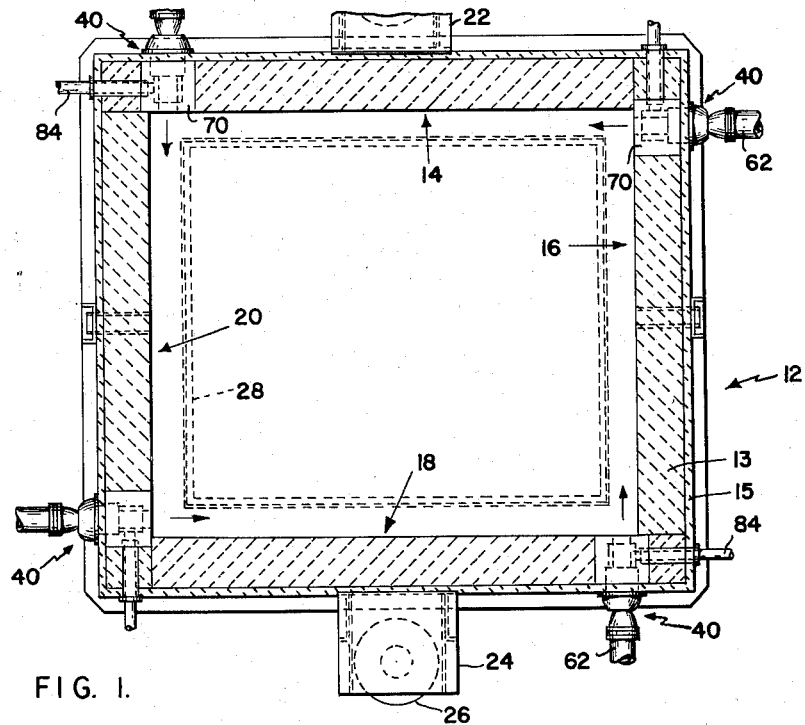
FIGURE 1 is a sectional plan view of a kiln in accordance with this invention.
Figure 2:
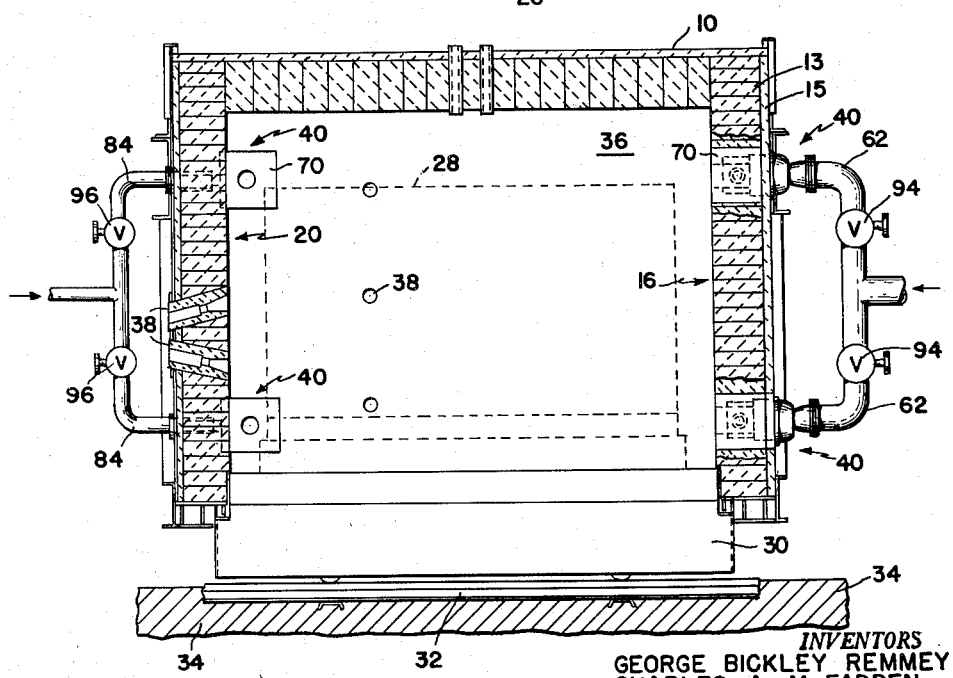
FIGURE 2 is a sectional elevational view of a kiln in accordance with this invention.
Figure 3:
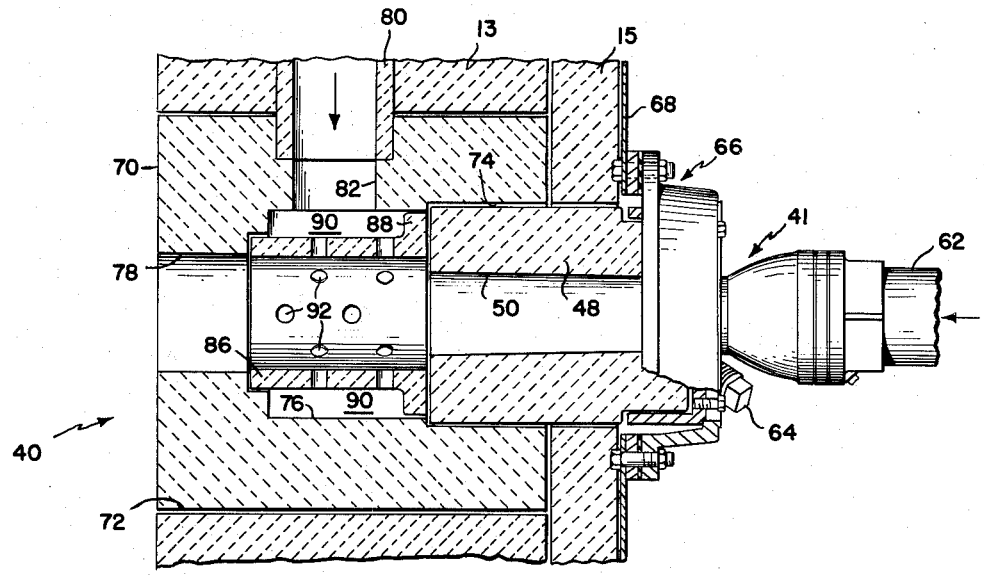
FIGURE 3 is a fragmentary sectional view of a burner assembly in accordance with this invention.

As shown in FIGURES 1 and 2, one form of kiln in accordance with this invention is rectangular in form having a ceiling 10 and a rectangular vertical wall 12 comprising walls 14, 16, 18 and 20. A pair of brackets 22 and 24 are mounted on oppositely disposed sides 14 and 18, respectively, and are cooperable with the supporting rods 26 of a hydraulic lift (not shown) which serves to raise and lower the kiln by means of brackets 22 and 24. The ware, the outline of which is indicated at 28, is supported on a kiln base 30 which is movable laterally on a track 32 in the floor 34. The bottom of vertical wall 12 is open and is adapted to cooperate with base 30 to enclose the ware 28 within a kiln heating chamber 36 defined by ceiling 30, vertical wall 12 and base 30. After the ware is positioned on the base 30, the wall and ceiling structure is raised by the hydraulic lift to permit movement of the base 30 beneath the wall and ceiling structure at which time the latter is lowered onto the base 30 to enclose the ware 28.

Ceiling 10 and wall 12 comprise an inner layer 13 of blocks of refractory material and a relatively thin outer shell 15 of block insulation. Base 30 comprises layers of blocks of refractory material. Mounted in wall 12 are suitable sight holes, as shown at 38, through which the ware 28 may be observed during the heating operation.

The burner assemblies for heating the ware 28 are indicated at 40 and are mounted in the vertical wall 12. One layer of burner assemblies is circumferentially spaced about wall 12 at the level of the lowermost portion of the ware. Another layer is provided at the upper end of the kiln. It will be apparent that the number of vertical layers of burner assemblies 40 is dependent upon the height of the kiln and the ware to be heated. In each layer, one of the burner assemblies 40 is positioned in each side of the wall 12 to direct a flame along an adjacent side as is shown by the arrows in the FIGURE 1. For example, the burner assembly mounted in side 18 directs a flame along side 16, and the burner assembly mounted in side 16 directs a flame along the side 14. By this arrangement, the burner assemblies may provide a gas stream completely encircling the ware as will be hereinafter described. It is noted that the ware is spaced from the wall 12 so that the gas stream issuing from the burner assemblies 40 will not directly contact any portion of the ware.

Each burner assembly 40 comprises a suitable burner 41 which may either be a gas burner or an oil burner of the type having a combustion chamber at its downstream end. The burner 41 disclosed herein is a gas burner comprising a body 42 having a cylindrical neck portion 44. Body 42 is cemented at 46 to a refractory block 48 adjacent neck 44. Block 48 defines a combustion tunnel 50 communicating with the interior of body 42 downstream of neck 44. A plug 52 having a cylindrical head disposed within neck 44 is mounted within body 42 by means of a spider 54 which supports a shank portion 56 of the plug 52. Plug 52 cooperates with neck 44 to define an annular orifice 58 and includes a refractory portion 60 projecting from the downstream thereof into tunnel 50.

Figure 4:
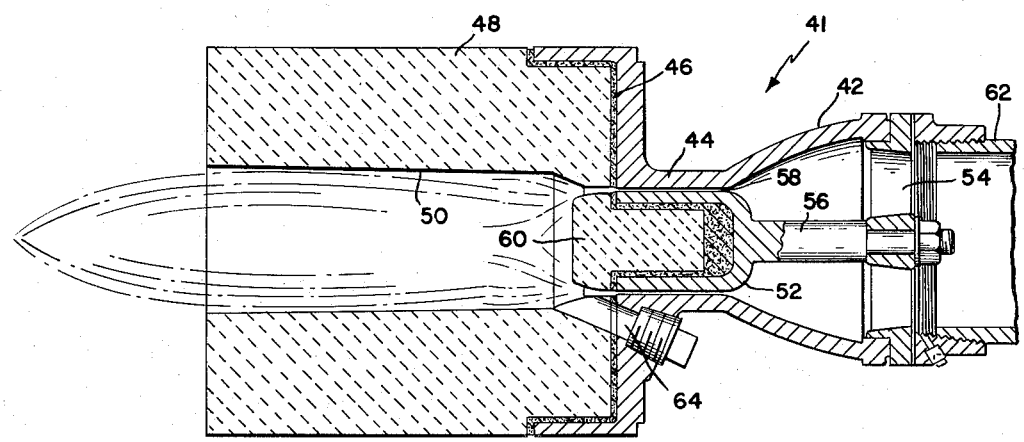
FIGURE 4 is a sectional view of a burner in accordance with this invention.

In operation, the burners 41 are provided with a suitable gaseous fuel-air mixture through suitable conduits 62. The burner 41 has a pilot connection 64 for ignition of the fuel-air mixture as it issues from orifice 58 to produce a flame as indicated by the broken lines in FIGURE 4, the combustion of which takes place largely in the combustion tunnel 50.

Suitable mounting means, indicated generally at 66, are provided for mounting the burners 41 in the vertical wall 12. Each burner 41 is secured to a mounting bracket 68 fastened to the shell 15 with block 48 extending through an opening in shell 15. A rectangular burner block 70 of refractory material is positioned in a rectangular opening 72 in the inner layer 13 of wall 12 and has a recess 74 adapted to receive the downstream end of the block 48. Burner block 70 has a central cavity 76 adjacent the upstream end of recess 74 and a bore 78 communicating with the upstream end of central cavity 76. Cavity 76 and bore 78 thus define a passageway to the heating chamber 36 through which the products of combustion from tunnel 50 pass.

A ceramic conduit 80 is mounted in wall 12 and communicates at its downstream end with a passageway 82 formed in burner block 70. Passageway 82 communicates with central cavity 76. Conduit 80 and passageway 82 provide a path for the flow of air into cavity 76 from the air supply conduits 84 which are connected to the upstream end of the conduits 80. Since air is diffused with the products of combustion from tunnel 50 in cavity 76, this cavity may be termed a diffusion chamber.

A cylindrical diffuser member 86 is mounted in central cavity 76 and defines, at the inner wall thereof, a passageway between tunnel 50 and bore 78. The inner wall of diffuser member 86, tunnel 50 and bore 78 are all in alignment. Diffuser member 86 has a radially extending flange 88 which positions the diffuser member 86 within cavity 76 so that the diffuser member outer wall is spaced from the wall of cavity 76 whereby an annular chamber 90 is formed adjacent the diffuser member outer wall. Diffuser member 86 has a plurality of radial openings 92 extending therethrough and circumferentially and longitudinally spaced thereabout. Openings 92 serve to meter or control the amount of air passing from chamber 90 through the diffuser member 86 into the products of combustion passing from combustion tunnel 50 of burner 41. Openings 92 may extend at an angle toward the interior of the kiln in order to minimize the back pressure on the burner 41. Diffuser member 86 is made of a material which can withstand extreme thermal shock and thermal stress, such as silicon carbide, silicon nitride, fireclay or other ceramics. Also, heat resistant metals of a chromium-nickel composition may be suitable, as for example, "Inconel," "Nichrome" or "Hastelloy."

In the firing of the kiln, a fuel-air mixture is supplied to the burners 41 through conduits 62 which have valves 94 serially connected therein for regulating the amount of fuel-air mixture passing to the burners 41. Air or a suitable inert gas is supplied to conduit 80 through conduits 84 which have valves 96 connected serially therein for regulating the amount of air or inert gas passing to the chamber 90. The valves 94 and 96 are adjusted either manually or automatically to provide the desired flame temperature and the length of the gas stream passing from the burner assemblies. In order to insure that all of the ware is heated uniformally the length of the gas stream passing from the burner assemblies 41 is adjusted so that the gas stream passes completely around wall 12 whereby a gas stream completely encircles the ware before any of the gas stream begins to rise because of its buoyancy.

The fuel-air mixture passes from the body 42 through orifice 58 into combustion tunnel 50 where it is ignited. The combustion of the fuel-air mixture takes place largely in the tunnel 50. The products of combustion leave combustion tunnel 50 at a temperature of from 2500° F. to 3200° F. and pass into the central opening in diffuser member 86. The secondary air passes from conduit 80 into annular chamber 90 from which the air passes through openings 92. Diffuser member 86 serves to meter the air and cause it to mix in small jets with the fully burned combustion products passing from the combustion tunnel 50. The diffuser member 86 insures that there is a thorough mixture or diffusion of the air and the products of combustion by reason of the plurality of openings 92 which direct the small jets of air at right angles into the products of combustion. Since the air is at room temperature which is considerably lower than the burner combustion products, the air will serve to lower the temperature of the gas stream passing into the heating chamber 36. Thus, diffuser member 86 is subjected to extreme thermal shock and temperature stresses and must be capable of withstanding such stresses.

By admixing room temperature air with the products of combustion passing from combustion tunnel 50, the temperature of the resultant gas stream entering the heating chamber 36 may be lowered to 500° F. or lower and the mass velocity of the resultant gas stream may be increased theoretically by six times. Thus, the harmful effects of excessive gas stream temperatures is eliminated and the ware throughout the heating chamber 36 is uniformally heated because the gas stream has adequate velocity to carry all the way around the heating chamber 36 before rising because of its buoyancy. The gas stream which encircles the ware comprises a plurality of individual gas streams each issuing from one of the burner assemblies 40 and passing along one of the sides of wall 12 between the issuing burner assembly and the location at which the adjacent burner assembly, which is mounted in the side along which the gas stream passes, issues a gas stream.

In the initial stage of the heating, it is desired to maintain the gas stream passing around the ware at the lowest possible temperature so that a maximum amount of air is added to the conduit 80. The fuel-air supply from conduits 62 is adjusted by means of valve 94 to provide the lowest possible flame that will provide a gas stream encircling the ware. The temperature of the ware is then gradually increased by increasing the fuel-air supply to the burner 41 to thereby increase the temperature of the gas stream passing from the burner assemblies by increasing the proportion of burner combustion products. At the same time, the supply of air to conduit 80 is cut back by means of adjustment of valves 96 by an amount such that the gas stream will continue to encircle the ware. It will be apparent that the cutting back of the secondary air has the effect of both increasing the temperature of the gas stream issuing from the burner assemblies and of decreasing the mass velocity of this gas stream.

To illustrate the effect of the admixing of diffusion air, it will be noted that a burner such as burner 41 when operated at a burner pressure of 0.5 inch W.C. produces a mass velocity 600% greater when diffusion air is added. Since convection heat transfer is directly proportional to the mass velocity of the gas stream, the heat transfer rate is also theoretically increased 600%. In actual operation however, the heat transfer rate is increased many times more than 600% as compared with conventional kilns. There are conditions in a conventional furnace where the gases due to their buoyancy do not contact certain parts of the ware at all with a net heating effect close to zero for periods which might be as long as 24 hours. During these 24 hours, the ware close to the burners might be heated by several hundred degrees. Thus, although the theoretical differential in heat transfer rates is 600%, the actual differential is probably closer to several thousands percent.

It will also be noted that the burner block 70 serves to shield the combustion tunnel 50 from radiating relationship with the ware. Also, the combustion tunnel 50 is considerably spaced from the ware. Thus, localized spot heating by radiation is avoided since the place where combustion occurs is removed and shielded from the ware.

Burner equipment may be compared by a consideration of the flame temperature in degrees Fahrenheit, the heat release in B.t.u.'s per hour, the flame length and the turndown range. By admitting diffusion air into the burner combustion tunnel after the combustion reaction is completed, the effective flame temperature is lowered and the operating range of the burner system is greatly increased even though the actual flame temperature is not changed or altered and even though the actual operating turndown range of the burner is not changed. While effects similar to those of the instant invention can be obtained with so-called long flame or nozzle mixing air burners, none of these are satisfactory for the firing of kilns because the flame is either extremely long even at low velocity and low operating rate, or the mixing of the excess air with the flame is poor thereby resulting in wide temperature variations across the flame front.

Another advantage of the kiln in accordance with the invention is that it is easily adaptable for automatic operation since the gas stream temperatures and velocities can be accurately predetermined and established. Thus, the firing may be pre-programmed by merely substituting for the valves 94 and 96, motorized control valves which are operated from time controlled cams to regulate the fuel-air input to the burners 41 and the air input to the diffuser members 86.

It will be apparent that changes may be made in the construction and arrangement of parts without departing from the scope of the invention. For example, the burner apparatus is usable in tunnel kilns or continuous furnaces wherein the work is moved horizontally through the furnace. The burner assemblies are thus arranged to produce a vertical wall of flame around the work. It is thus not desired to be limited except as set forth by the following claims.

What is claimed is:

1. A furnace comprising means defining a heating chamber adapted to receive the work to be heated and including a refractory wall for providing a wall of the heating chamber encircling the work, a plurality of individual burner assemblies providing individual heating gas streams and mounted in said wall at circumferentially spaced positions, each of said burner assemblies directing substantially all of its heating gas stream in a path alongside said wall encircling the work, each of said burner assemblies having means defining a diffusion chamber, a burner means directing its products of combustion through said diffusion chamber and into said heating chamber, and means for admixing sufficient gas with said products of combustion in said diffusion chamber whereby the gas stream entering said heating chamber has a greater mass velocity than the burner products of combustion, the diffusion chamber for each burner means being separate from the diffusion chambers of the other burner means.

2. A furnace as claimed in claim 1 wherein each of said means defining a diffusion chamber is constructed of a heat insulating material and is positioned between said burner means and said heating chamber whereby said means defining said diffusion chamber shields the ware from the heat radiation effects of said burner means.

3. A furnace comprising means defining a heating chamber adapted to receive the work to be heated and including a refractory wall for providing a wall of the heating chamber encircling the work, a plurality of individual burner assemblies mounted in said wall at circumferentially spaced positions, said burner assemblies directing a heating gas stream in a path alongside said wall encircling the work, each of said burner assemblies having means defining a diffusion chamber, a burner means having a combustion tunnel adjacent said diffusion chamber, said burner means being constructed and arranged to direct its products of combustion along a straight path from said combustion tunnel, through said diffustion chamber and into said heating chamber, means for admixing sufficient air with said products of combustion in said diffusion chamber whereby the gas stream entering said heating chamber has a greater mass velocity than the burner products of combustion, means for supplying fuel to said burner means including means for regulating the amount of fuel supplied, and means for supplying air to said admixing means including means for regulating the amount of air supplied.

4. A burner assembly for the heating of furnaces comprising a burner having a combustion tunnel portion open at its downstream end, a burner block defining a diffusion chamber in unrestricted communication with the downstream end of said combustion tunnel, means defining a passageway communicating at its downstream end with said diffusion chamber, said burner directing its products of combustion from said combustion tunnel into said diffusion chamber, and means for supplying sufficient air to said diffusion chamber through said passageway to cause admixture of said air with the burner products of combustion whereby the mass velocity of the gas stream leaving said burner block is greater than the mass velocity of said burner products of combustion.

5. A burner assembly for the heating of furnaces comprising a burner having a combustion tunnel portion open at its downstream end, a burner block of refractory material adapted to be mounted in a side wall of a furnace and defining a diffusion chamber in unrestricted direct communication with the downstream end of said combustion tunnel, said block also defining a passageway communicating at its downstream end with said diffusion chamber, said burner directing its combustion products through said diffusion chamber, means for supplying sufficient air to the upstream end of said passageway, and a diffuser member in said diffusion chamber defining a path from said combustion tunnel through said diffusion chamber and including port means for controlling the flow of air from said passageway into said path for admixture with the burner combustion products whereby said admixed gas stream leaves said diffusion chamber with a mass velocity greater than the mass velocity of the burner combustion products.

6. A burner assembly as claimed in claim 5 wherein said diffuser member comprises a hollow conduit of heat resistant refractory material, the hollow portion of said conduit defining said path from said combustion tunnel through said diffusion chamber.

7. A burner assembly apparatus as claimed in claim 6 wherein said port means comprises a plurality of radial openings circumferentially and longitudinally spaced in the side of said hollow conduit, said openings controlling the flow of air into said path and directing jets of air into said burner combustion products passing through said path.

8. The method of firing a furnace chamber comprising the steps of directing the products of combustion from a plurality of burner combustion chambers through an individual diffusion chamber upstream of the furnace chamber and downstream of each burner combustion chamber into the furnace chamber at spaced locations and adding a gas to each of said diffusion chambers for admixture with the burner combustion products at a rate whereby the mass velocity of the gas stream leaving each of said diffusion chambers is greater than the mass velocity of the burner combustion products.

9. The method of firing a furnace chamber comprising the steps of directing the products of combustion from a plurality of burner combustion chambers through an individual diffusion chamber upstream of the furnace chamber and downstream of each burner combustion chamber into the furnace chamber at spaced locations and admixing gas with the burner combustion products in each of said chambers, said air having a temperature less than the burner combustion products and being of sufficient amount whereby the mass velocity of the gas stream leaving each diffusion chamber is greater than the mass velocity of the burner combustion products and the temperature of said gas stream is lower than the temperature of the burner combustion products.

10. A furnace comprising means defining a heating chamber adapted to receive the work to be heated and including a refractory wall for encircling the work, a plurality of burner assemblies mounted in said wall at circumferentially spaced positions, each of said burner assemblies directing a heating gas stream in a path alongside said wall encircling the work toward a circumferentially adjacent burner assembly for providing a heating gas stream encircling the work, each of said burner assemblies having means defining a diffusion chamber separate from the diffusion chambers of the other burner assemblies, a burner means adjacent said diffusion chamber directing its products of combustion along a straight path through said diffusion chamber and directly into said heating chamber, and means for admixing gas at a temperature lower than said products of combustion with said products of combustion in said diffusion chamber.

11. A furnace as claimed in claim 1 comprising a second group of a plurality of circumferentailly spaced burner assemblies mounted in said wall, said second group of burner assemblies being constructed and arranged as said first-named burner assemblies and axially spaced therefrom.

References Cited in the file of this patent

UNITED STATES PATENTS

| | | |
|---|---|---|
| 1,339,190 | Fuller | May 4, 1920 |
| 2,059,523 | Hepburn et al. | Nov. 3, 1936 |
| 2,107,365 | Bray | Feb. 8, 1938 |
| 2,343,004 | Elder et al. | Feb. 29, 1944 |
| 2,458,624 | Morton et al. | Jan. 11, 1949 |
| 2,676,007 | Davis | Apr. 20, 1954 |
| 2,808,254 | O'Brien | Oct. 1, 1957 |